US010315628B2

(12) United States Patent
Raymond, Sr.

(10) Patent No.: US 10,315,628 B2
(45) Date of Patent: Jun. 11, 2019

(54) SEMITRAILER LANDING GEAR CONTROLLER ASSEMBLY

(71) Applicant: John Raymond, Sr., Lakeside, TX (US)

(72) Inventor: John Raymond, Sr., Lakeside, TX (US)

( * ) Notice: Subject to any disclaimer, the term of this patent is extended or adjusted under 35 U.S.C. 154(b) by 0 days.

(21) Appl. No.: 16/106,720

(22) Filed: Aug. 21, 2018

(65) Prior Publication Data
US 2019/0061707 A1 Feb. 28, 2019

Related U.S. Application Data

(60) Provisional application No. 62/551,583, filed on Aug. 29, 2017.

(51) Int. Cl.
*B60S 9/10* (2006.01)
*B60S 9/04* (2006.01)

(52) U.S. Cl.
CPC .. *B60S 9/10* (2013.01); *B60S 9/04* (2013.01)

(58) Field of Classification Search
CPC ...... B60S 9/02; B60S 9/10; B60S 9/12; B60S 9/16; B60S 9/18; B60S 9/20; B60D 1/66; B60D 1/665
USPC ............. 280/763.1, 764.1, 765.1, 766.1
See application file for complete search history.

(56) References Cited

U.S. PATENT DOCUMENTS

| | | | | |
|---|---|---|---|---|
| 4,345,779 A * | 8/1982 | Busby | ........... | B60S 9/20 280/766.1 |
| 4,402,526 A * | 9/1983 | Huetsch | ........... | B60S 9/08 280/766.1 |
| 5,050,845 A * | 9/1991 | Aline | ........... | B60S 9/12 254/419 |
| 5,176,391 A * | 1/1993 | Schneider | ........... | B60G 17/005 180/41 |
| 5,299,829 A * | 4/1994 | Rivers, Jr. | ........... | B60S 9/10 254/419 |
| 5,312,119 A * | 5/1994 | Schneider | ........... | B60G 17/005 280/755 |
| 5,401,046 A * | 3/1995 | Schwartz | ........... | B60S 9/12 254/419 |
| 5,409,251 A * | 4/1995 | Thorndyke | ........... | B60S 9/12 280/475 |
| 5,451,076 A * | 9/1995 | Burkhead | ........... | B60S 9/04 280/475 |
| 5,465,940 A * | 11/1995 | Guzman | ........... | B60S 9/12 254/423 |
| 5,509,687 A * | 4/1996 | Thorndike | ........... | B60S 9/12 254/419 |
| 5,911,437 A * | 6/1999 | Lawrence | ........... | B60S 9/10 254/419 |

(Continued)

*Primary Examiner* — Jeffrey J Restifo
(74) *Attorney, Agent, or Firm* — Global Intellectual Property Agency, LLC; Daniel Boudwin

(57) ABSTRACT

A semitrailer landing gear controller assembly for automating the extension and retraction of a semitrailer landing gear using an external input of pressurized air. The device includes a primary member designed to receive and rotate a removeable secondary member installed over a turning axle for a semitrailer landing gear, where rotation of the turning axle corresponds to the extension or retraction of a semitrailer landing gear depending on the direction of rotation. The primary member further including a turbine designed to drive rotation of the secondary member with the force of pressurized air obtained from an external input of pressurized air, like the supply line from a semitrailer.

19 Claims, 5 Drawing Sheets

(56) References Cited

U.S. PATENT DOCUMENTS

| | | | | |
|---|---|---|---|---|
| 6,099,016 A * | 8/2000 | Peveler | B60S 9/08 254/419 |
| 6,224,103 B1 * | 5/2001 | Hatcher | B60S 9/08 254/419 |
| 6,260,882 B1 * | 7/2001 | Kingsbury | B60S 9/08 254/219 |
| 6,598,886 B2 * | 7/2003 | Baird | B60P 1/56 254/419 |
| 6,896,289 B2 * | 5/2005 | Gross | B60S 9/08 254/419 |
| 6,913,248 B1 * | 7/2005 | Schmitz | B60S 9/12 254/423 |
| 6,926,305 B2 * | 8/2005 | Daniel | B60S 9/08 254/419 |
| 6,948,702 B1 * | 9/2005 | Nigro | B60S 9/12 254/423 |
| 7,004,457 B2 * | 2/2006 | Jackson, Sr. | B60S 9/12 254/423 |
| 7,036,847 B2 * | 5/2006 | Alguera | B60S 9/08 280/763.1 |
| 7,044,445 B1 * | 5/2006 | Crawford | B60S 9/08 254/425 |
| 7,163,207 B2 * | 1/2007 | Baird | B60P 1/56 254/419 |
| 7,290,799 B2 * | 11/2007 | Santos | B60S 9/12 254/418 |
| 7,429,061 B2 * | 9/2008 | Perkins | B60S 9/08 280/763.1 |
| 7,651,114 B2 * | 1/2010 | Weber | B60D 1/36 254/419 |
| 7,726,690 B1 * | 6/2010 | James | B60J 7/165 280/764.1 |
| 8,827,309 B1 * | 9/2014 | Ouellet | B60S 9/08 254/418 |
| 8,919,738 B2 * | 12/2014 | Daniel | B60S 9/12 254/418 |
| 9,790,067 B2 * | 10/2017 | Riedl | B66F 7/0608 |
| 2006/0119089 A1 | 6/2006 | Rivers et al. | |

\* cited by examiner

SEMITRAILER LANDING GEAR CONTROLLER ASSEMBLY

CROSS REFERENCE TO RELATED APPLICATION

This application claims the benefit of U.S. Provisional Application No. 62/551,583 filed on Aug. 29, 2017. The above identified patent application is herein incorporated by reference in its entirety to provide continuity of disclosure.

BACKGROUND OF THE INVENTION

The present invention relates to the extension and retraction of semitrailer landing gears. More specifically, the present invention provides a convenient automated alternative to the common practice of having a driver manually turn a crank handle to raise or lower the landing gears.

Semitrailers include telescopic stands known as landing gears. These landing gears are positioned toward a front end of semitrailers, and they are utilized to support semitrailers on the ground when not attached to a truck. The landing gear is typically extended and retracted via a manually operated crank handle. However, hand-cranking the landing gear can result in exhaustion, muscle aches, and back injuries for the truck driver. In the trucking industry, an injured back can translate into an inability to work. The inability to work can lead to workers compensation claims, which is a very costly operating expense for trucking companies. Drivers often couple and uncouple several trailers a day and manually operating the gear is time consuming and tiring. In order to address these concerns, the present invention provides a semitrailer landing gear control assembly that utilizes an external input compressed air to automatically extend and retract the landing gear of a semitrailer without requiring manual operation from the driver.

Devices have been disclosed in the known art that relate to semitrailer landing gear controllers. These include devices that have been patented and published in patent application publications. These devices generally relate to automated means of raising and lowering the landing gear of a semitrailer, however these devices do not integrate with the existing framework of a semitrailer and require significant modification to be made to the semitrailer before they can be used. The present invention is designed to be used in conjunction with the existing framework of the semitrailer without need for redesign or significant modification.

In light of the devices disclosed in the known art, it is submitted that the present invention substantially diverges in design elements from the known art and consequently it is clear that there is a need in the art for an improvement to existing semitrailer landing gear controller devices. In this regard the instant invention substantially fulfills these needs.

SUMMARY OF THE INVENTION

In view of the foregoing disadvantages inherent in the known types of semitrailer landing gear controller devices now present in the known art, the present invention provides a new semitrailer landing gear controller device wherein the same can be utilized for providing convenience for the user when raising or lowering semitrailer landing gears.

It is therefore an object of the present invention to provide a new and improved semitrailer landing gear controller device that has all of the advantages of the known art and none of the disadvantages.

Another object of the present invention is to provide a primary member configured to receive and rotate a removeable secondary member, wherein the primary member is further configured to be slidably mounted to a chassis of a semi-trailer truck such that the secondary member is disposed over a turning axle for a semitrailer landing gear.

Yet another object of the present invention is to provide a primary member including an open frost end and an interior cavity configured to receive the secondary member, such that the secondary member can be fully rotated about is axis asserted.

A further object of the present invention is to provide a first roller disposed on the near-side of the outer wall of the primary member and a second roller disposed on the far-side of the outer wall of the primary member are configured to facilitate mounting and front-to-back lateral motion of the primary member.

Another object of the present invention is to provide a primary member further includes a handle disposed on a back end thereof, an air intake aperture configured to intake pressurized air, and a controller switch configured to direct a semitrailer landing gear to extend or retract.

Yet another object of the present invention is to provide a secondary member having an open first end and an interior volume sized and proportioned to receive the turning axle for a semitrailer landing gear, a second end configured to be inserted into the open interior cavity of the primary member, and a pair of apertures disposed on either side of the secondary member, such that a locking bolt can be inserted through both apertures and the turning axle for a semitrailer landing gear.

An additional object of the present invention is to provide a first mounting bracket having a first lateral groove carved therethrough is configured to be mounted on the near side of the turning axle for a semitrailer landing gear, and a second mounting bracket having a second lateral groove carved therethrough is configured to be mounted on the far side of the turning axle for a semitrailer landing gear, such that the two rollers of the primary member can be inserted through and slide along the grooves.

Still another object of the present invention is to provide an air hose has a first end that is removably attached to the primary member, and a connector head disposed on the second end configured to interlock with an external input of pressurized air, wherein the connector head disposed on the second end is a gladhand connector and the external input of pressurized air is a supply line from a tractor trailer.

A further object of the present invention is to provide a socket is disposed in the back end of the primary member, such that the socket is sized and proportioned to receive a crank handle used in the manual rotation of the turning axle for a semitrailer landing gear.

Another object of the present invention is to provide a handle comprising a plurality of arms joined to a semicircular rod configured to facilitate the pushing or pulling of the primary member in order to change the gears of the landing gear controller assembly.

Yet another object of the present invention is to provide a handle comprises a pair of L-shaped arms disposed on opposing sides of the primary member configured to facilitate the pushing or pulling of the primary member in order to change the gears of the landing gear controller assembly, wherein each L-shaped arm contains an aperture configured to receive a portion of a gripping hand.

A further object of the present invention is to provide a controller switch includes the three following operational modes: (i) extend, (ii) retract, and (iii) neutral, wherein a turbine disposed within the interior cavity of the primary member is configured to rotate the secondary member, such that in the extend mode the secondary member is rotated clockwise, in the retract mode the secondary member is rotated anclockwise, and in the neutral mode the secondary member is not rotated in either direction.

Another object of the present invention to provide a turbine including a plurality of protruding arms extending out toward the front end of the primary member, and configured to removably secure the turbine to the secondary member via a plurality of grooves disposed on the second end of the secondary member configured to receive the plurality of protruding arms.

Yet another object of the present invention is to provide a primary member including an a channel having a first end and a second end interconnected at the air intake aperture, wherein the first end is configured to expel pressurized air to rotate the turbine in the clockwise direction, and the second end is configured to expel pressurized air to rotate the turbine in the anticlockwise direction.

An additional object of the present invention is to provide a controller switch is operably connected to a stopper via a control line, such when the controller switch is in the extend position the stopper is configured to redirect all incoming pressurized air toward the first end, when the controller switch is in the retract position the stopper s configured to redirect all incoming pressurized air toward the second end, and when the controller switch is in the neutral position the stopper is configured to prevent all incoming pressurized air from entering the air channel.

Still another object of the present invention is to provide a pair of rollers disposed on either side of the primary member that are removably attached.

A further object of the present invention is to provide a pair of rollers having a threaded portion configured to fasten the rollers to the primary member.

Another object of the present invention is to provide a semitrailer landing gear controller assembly that may be readily fabricated from materials that permit relative economy and are commensurate with durability.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out n the claims, the invention itself acid manner in which it may be made and used may be better understood after a review of the following description, taken in connection with the accompanying drawings wherein like numeral annotations are provided throughout.

DETAILED DESCRIPTION OF THE INVENTION

Figure 1:
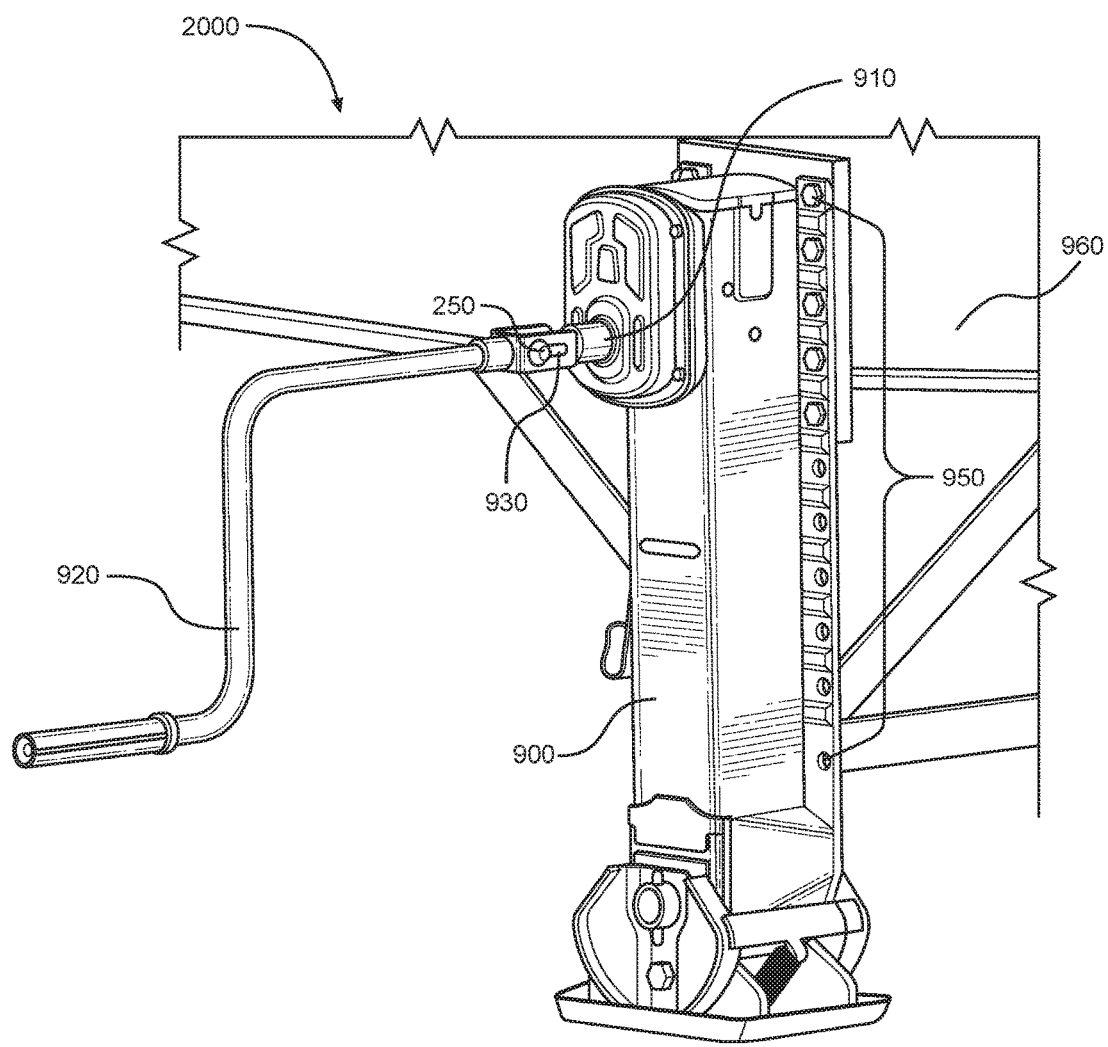
FIG. 1 shows a perspective view of an embodiment of a manually operated landing gear controller assembly.

Reference is made herein to the attached drawings. Like reference numerals are used throughout the drawings to depict like or similar elements of the semitrailer landing gear controller assembly. For the purposes of presenting a brief and clear description of the present invention, the preferred embodiment will be discussed as used for the semitrailer landing gear controller assembly. The figures are intended for representative purposes only and should not be considered to be limiting is any respect.

Referring now to FIG. 1, there is shown a perspective view of an embodiment of a manually operated retractable landing gear for a semitrailer. The manually operated landing gear controller assembly 2000 comprises a retractable landing gear 900 is configured to extend downwards when a turning axle 910 is rotated clockwise and to retract upwards when the turning axle 910 is rotated anti-clockwise. Both clockwise and anti-clockwise rotations are accomplished with a crank handle 920 configured to be removably attached to the turning axle 910 via a locking pin 250 (see FIG. 2A). The locking pin 250 is configured to pass through a pair of bore holes 930 in the crank handle 920 and a channel in the locking pin (not shown), such that a fastener 255 (see FIG. 2A) secures the locking pin 250 to both the turning axle 910 and the crank handle 920. The retractable landing gear 900 further includes a plurality of apertures 950 configured to receive bolts that secure the landing gear to a chassis 960 of a semitrailer. Additionally, the plurality apertures 950 can be used to secure mounting brackets to either side of the landing gear 900. In the illustrated embodiment, the mounting brackets are configured to be attached to the landing gear 900 along the apertures 950 using four bolts.

Figure 2A:
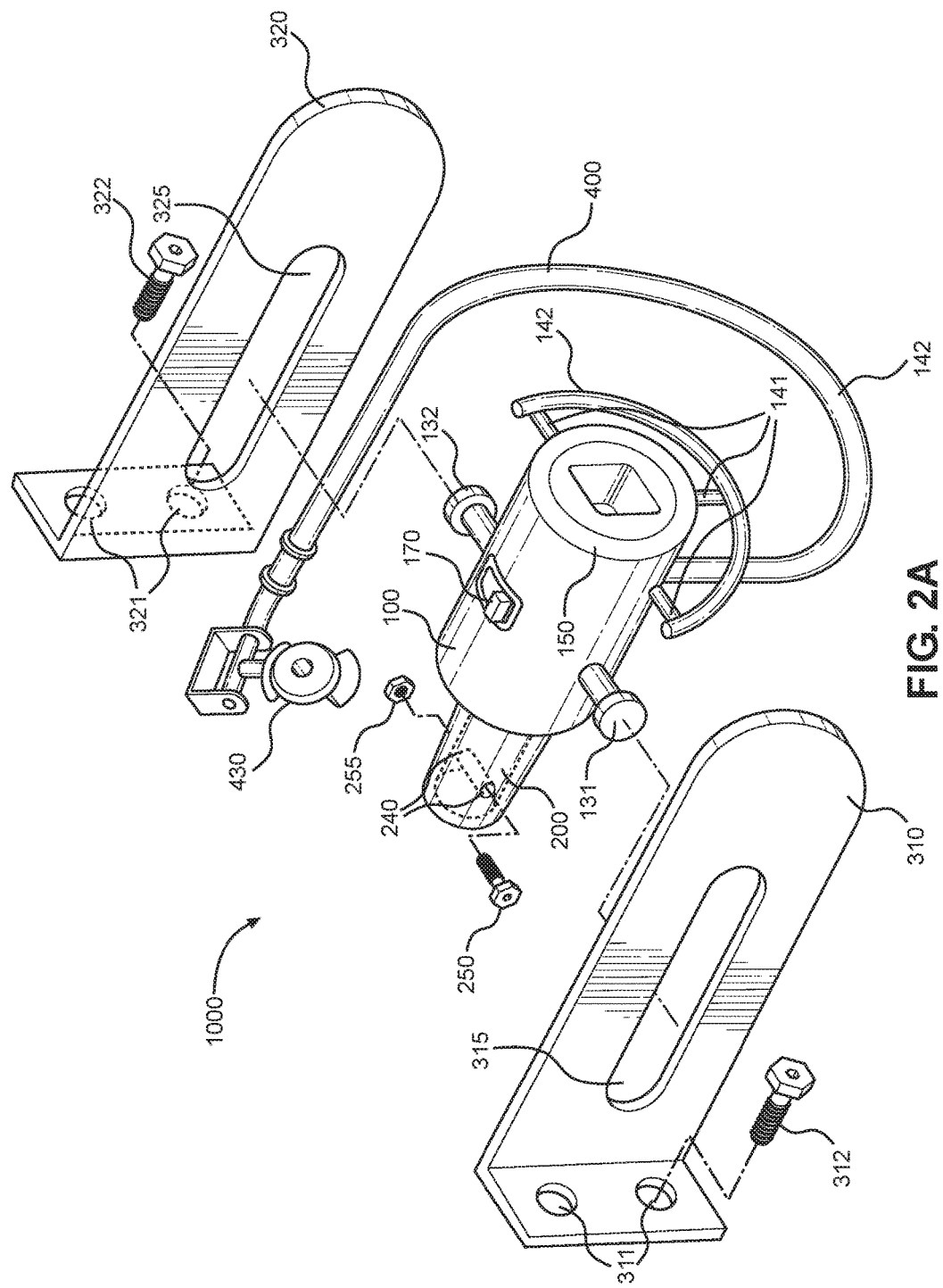
FIG. 2A shows a perspective view of embodiment of the semitrailer landing gear controller assembly with mouthing brackets.
Figure 2B:
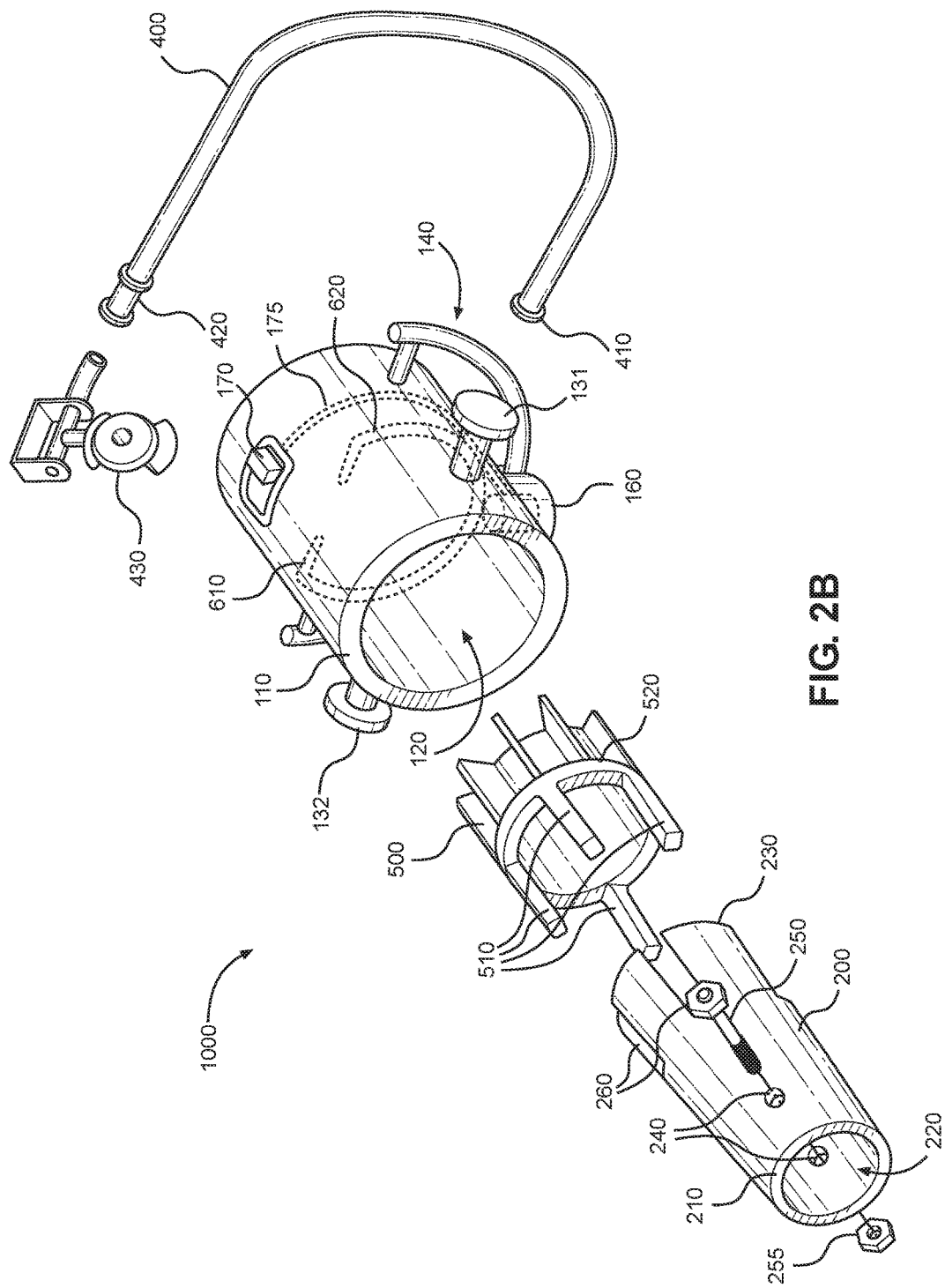
FIG. 2B shows an exploded view of an embodiment of the semitrailer landing gear controller assembly.
Figure 2C:
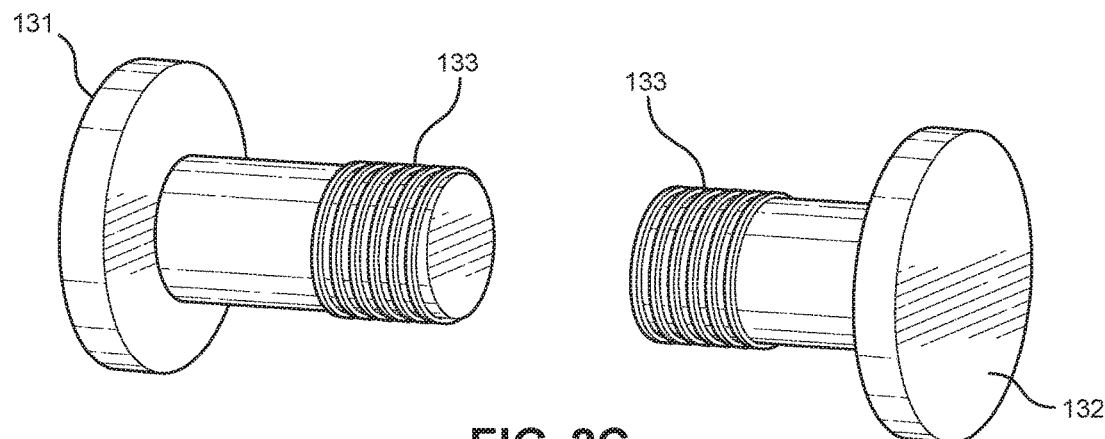
FIG. 2C shows a perspective view of a pair of detachable rollers for an embodiment of the semitrailer landing gear controller assembly.

Referring now to FIGS. 2A, 2B and 2C, there are shown a perspective view of an embodiment of the semitrailer landing gear controller assembly with mounting brackets, an exploded view of an embodiment of the semitrailer lancing gear controller assembly, and a pair of detachable rollers for an embodiment of the semitrailer landing gear controller assembly, respectively. In the illustrated embodiment, the semitrailer landing gear controller assembly 1000, comprises a primary member 100 configured to receive and rotate a removeable secondary member 200, such that the primary member 100 is further configured to be slidably mounted to a chassis of a semi-trailer truck 960 via the plurality apertures 950 (see FIG. 1) allowing the secondary member 200 to disposed over the turning axle 910 for the semitrailer landing gear 900. The primary member 100 also includes an open front end 110 and an interior cavity 120 configured to receive the secondary member 200, such that the secondary member 200 can be fully rotated about its axis when inserted. The secondary member 200 also includes an open first end 210 and an interior volume 220 sized and proportioned to receive the turning axle 910 for a semitrailer landing gear, a second end 230 configured to be inserted into the open interior cavity 120 of the primary member, and a pair of apertures 240 disposed on either side of the secondary member, such that a locking bolt 250 can be inserted through both apertures 240 and the turning axle 910 for a semitrailer landing gear and secured by a fastener 255.

The semitrailer landing gear controller assembly comprises a first roller 131 disposed on the near-side of the outer wall of the primary member 100 and a second roller 132 disposed on the far-side of the outer wall of the primary member 100. Together, the two rollers 131, 132 are configured to facilitate mounting and front-to-back lateral motion of the primary member 100 in order to change the gears of the landing gear controller assembly. Furthermore, a first mounting bracket 310 having a first lateral groove 315 carved therethrough is configured to be mounted on the near side of the turning axle for a semitrailer landing gear, and a second mounting bracket 320 having a second lateral groove 325 carved therethrough is configured to be mounted on the far side of the turning axle 910 for a semitrailer landing gear, such that the two rollers 131, 132 of the primary member 100 can be inserted through and slide along the grooves 315, 325. In illustrated embodiment the rollers 131, 132 disposed on either side of the primary member are removably attached, such that the rollers 131, 132 each include a threaded portion 133, configured to fasten the rollers to the primary member 100. By including removable rollers 131, 132 the mounting brackets can first be installed independently from the primary and secondary members 100, 200, and the rollers 131, 132 can be conveniently inserted through the grooves 315, 325 after the primary and secondary members 100, 200 are properly positioned.

The illustrated embodiment also shows where the primary member 100 further includes an air intake aperture 160 configured to intake pressurized air, and a handle 140 disposed on a back end 150 thereof such that the handle 140 comprises a plurality of arms 141 joined to a semicircular rod 142 configured to facilitate the pushing or pulling of the primary member 100 in order to change the gears of the landing gear controller assembly. In use, when the handle 140 is pushed or pulled, the primary member 100 in turn pulls or pushes the turning axle of the landing gear controller assembly which changes the gear from a lower to higher gear, respectively. The configuration and shape of the handle 140 is designed to avoid obstruction of the container positioned approximately 2 inches above the landing gear controller assembly.

Additionally, a turbine 500 is disposed with in the interior cavity 120 of the primary member 100 and configured to rotate the secondary member 200. The turbine 500 further includes a plurality of protruding arms 510 extending out toward the front end 110 of the primary member 100, and is configured to removably secure the turbine 500 to the secondary member 200 via a plurality of grooves 260 disposed on the second end 230 of the secondary member 200 configured to receive the plurality of protruding arms 510. Furthermore, an air hose 400 has a first end 410 that is removably attached to the primary member 100 via the air intake aperture 160. The air hose 400 includes a connector head 430 disposed on the second end 420 that is configured to interlock with an external input of pressurized air.

In the illustrated embodiment the connector head 430 disposed on the second end is a gladhand connector and the external input of pressurized air supply line from a semitrailer. Typically, when parked the supply line of a semitrailer can provide up to as much as 120 psi of air pressure to drive the rotation of the turbine 500, which in turn rotates the secondary member 200 to extend of retract the landing gear. Because the supply line is included as a standard feature in contemporary semitrailers, it serves as a readily accessible source of pressurized air for the installation and use of the semitrailer-landing gear controller assembly 1000. By retrofitting the supply line to the semitrailer landing gear controller assembly 1000 truck drivers can more efficiently complete the process of coupling and uncoupling semitrailer, while also avoiding the potential health risks associated with the manual process of using a crank handle to raise or lower a landing gear.

Figure 3A:
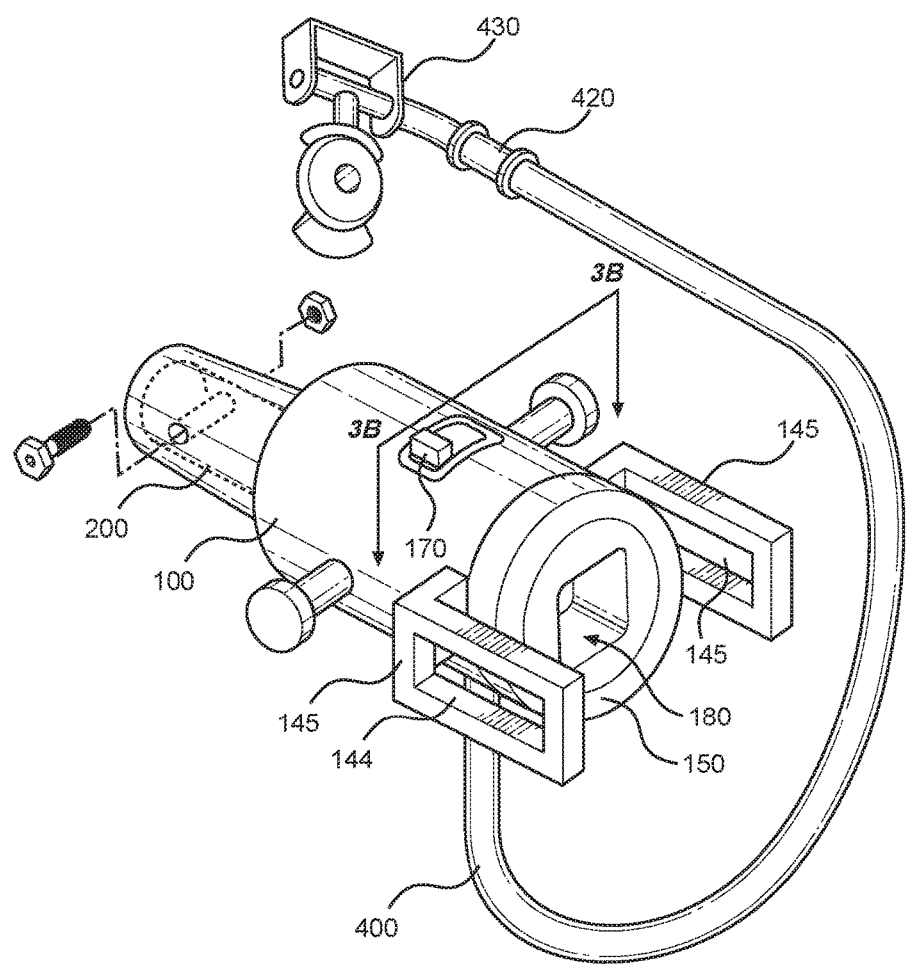
FIG. 3A shows a perspective view of an embodiment of the semitrailer landing gear controller assembly having L-shaped handles.
Figure 3B:
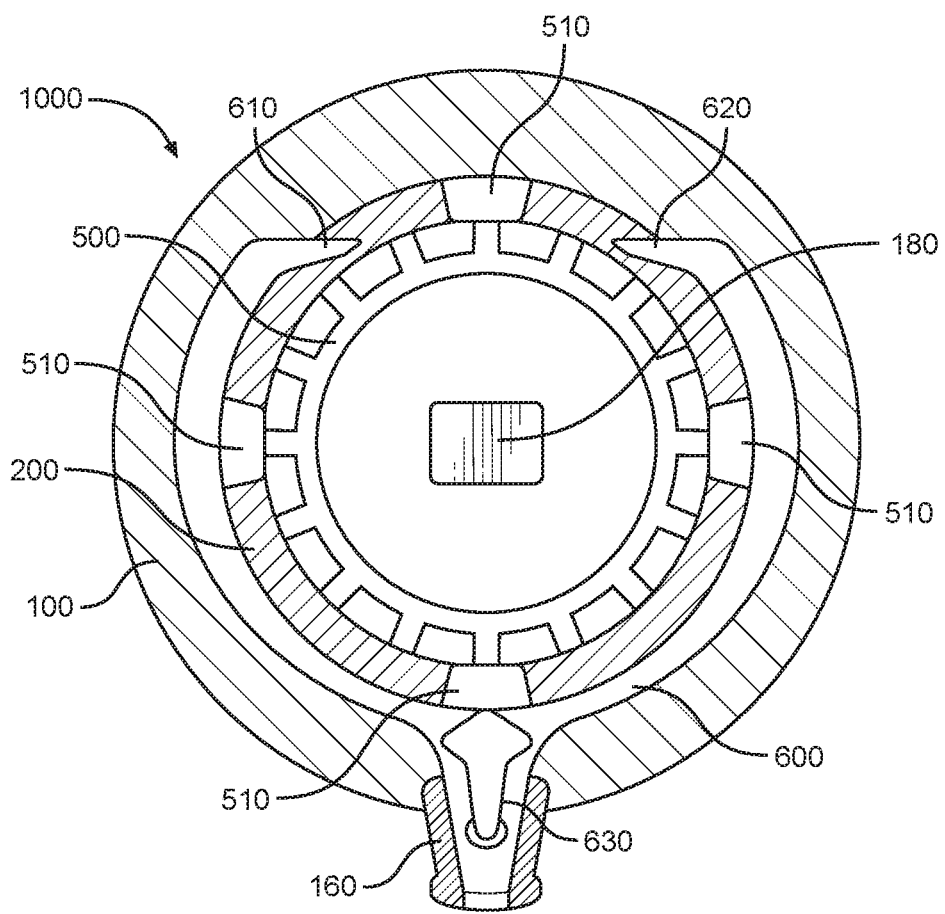
FIG. 3B shows a cross-sectional view of an embodiment of the semitrailer landing gear controller assembly along line 2C in FIG. 2A.

Referring now to FIGS. 3A and 3B, there are shown perspective views of an embodiment of the semitrailer landing gear controller assembly having L-shaped handles, and a cross-sectional view of an embodiment of the semitrailer landing gear controller assembly along line 3B, respectively. In the illustrated embodiment, a controller switch 170 is configured to direct a semitrailer landing gear to extend or retract. The controller switch 170 includes the three following operational modes: (i) extend, (ii) retract, and (iii) neutral. In the extend mode the secondary member 200 is rotated clockwise by the turbine 500, in the retract mode the secondary member 200 is rotated anticlockwise, and in the neutral mode the secondary member 200 is not rotated in either direction. In the event that no external input of pressurized air is available to drive the turbine 500, a socket 180 is disposed in the back end 150 of the primary member 100, such that the socket 180 is sized and proportioned to receive a crank handle 920 (see FIG. 1) used in the manual rotation of the turning axle 910 for a semitrailer landing gear 900.

FIG. 3B shows where the primary member 100 further includes an air channel 600 having a first end 610 and a second end 620 interconnected at the take aperture 160, such that the first end 610 is configured to expel pressurized air to rotate the turbine 500 in the clockwise direction, and the second end 620 is configured to expel pressurized air to rotate the turbine 500 in the anticlockwise direction. Furthermore, the controller switch 170 is operably connected to a stopper 630 via a control line 175 (see FIG. 2B), such that when the controller switch 170 is in the extend position the stopper 630 is configured to shift to the right to redirect all incoming pressurized air through the air channel 600 toward the first end 610, when the controller switch 170 is in the retract position the stopper 630 is configured to shift to the left to redirect all incoming pressurized air through the air channel 600 toward the second end 620, and when the controller switch 170 is in the neutral position the stopper 630 is configured shift downward to prevent all incoming pressurized air from entering the air channel 600. In the illustrated embodiment the stopper 630 is T-shaped, such that when centered air can pass the stopper 630 on both sides, and when shifted downward the upper portion of the "T" is sized and proportioned to block off the entry way into the air channel 600 from the air intake 160.

Additionally, in some embodiments the handle 140 comprises a pair of L-shaped arms 145 disposed on opposing sides of the primary member 100 configured to facilitate the pushing or pulling of the primary member 100 in order to change the gears of the landing gear controller assembly. As previously stated, the configuration and shape of the handle 140 is designed to avoid obstruction of the container positioned approximately 2 inches above the landing gear controller assembly. Furthermore, each L-shaped arm 145 contains an aperture 144 configured to receive a portion of a gripping hand to increase the ease of use for the user when manipulating the primary member 100.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A semitrailer landing gear controller assembly, comprising:
    primary member configured to receive and rotate a removeable secondary member;
    wherein the primary member is further configured to be slidably mounted to a chassis of a semi-trailer truck such that the secondary member is disposed over a turning axle for a semitrailer landing gear;
    the primary member including an open front end and an interior cavity configured to receive the secondary member, such that the secondary member can be fully rotated about its axis when inserted;
    a first roller disposed on the near-side of the outer wall of the primary member and a second roller disposed on the far-side of the outer wall of the primary member are configured to facilitate mounting and front-to-back lateral motion of the primary member;
    the primary member further includes a handle disposed on a back end thereof, an air intake aperture configured to intake pressurized air, and a controller switch configured to direct a semitrailer landing gear to extend or retract;
    the secondary member having an open first end and an interior volume sized and proportioned to receive the turning axle for a semitrailer landing gear, a second end configured to be inserted into the open interior cavity of the primary member, and a pair of apertures disposed on either side of the secondary member, such that a locking bolt can be inserted through both apertures and the turning axle for a semitrailer landing gear.

2. The semitrailer landing gear controller assembly of claim 1, wherein a first mounting, bracket having a first lateral groove carved therethrough is configured to be mounted on the near side of the turning axle for a semitrailer landing gear, and a second mounting bracket having a second lateral groove carved therethrough is configured to be mounted on the far side of the turning axle for a semitrailer landing gear, such that the two rollers of the primary member can be inserted through and slide along the grooves.

3. The semitrailer landing gear controller assembly of claim 1, wherein an air hose has a first end that is removably attached to the primary member, and a connector head disposed on the second end configured to interlock with an external input of pressurized air.

4. The semitrailer landing gear controller assembly of claim 3, wherein the connector head disposed on the second end is a gladhand connector.

5. The semitrailer landing gear controller assembly of claim 3, wherein the external input of pressurized air is a supply line from a tractor trailer.

6. The semitrailer landing gear controller assembly claim 1, wherein a socket is disposed in the back end of the primary member, such that the socket is sized and proportioned to receive a crank handle used in the manual rotation of the turning axle for a semitrailer landing gear.

7. The semitrailer landing gear controller assembly of claim 6, wherein the handle comprises a plurality of arms joined to a semicircular rod.

8. The semitrailer landing gear controller assembly of claim 6, wherein the handle comprises a pair of L-shaped arms disposed on opposing sides of the primary member.

9. The semitrailer landing gear controller assembly of claim 8, wherein each L-shaped arm contains an aperture configured to receive a portion of a gripping hand.

10. The semitrailer landing gear controller assembly of claim 1, wherein the controller switch includes the three following operational modes: extend, retract, and neutral.

11. The semitrailer landing gear controller assembly of claim 10, wherein a turbine disposed within the interior cavity of the primary member is configured to rotate the secondary member, such that in the extend mode the secondary member is rotated clockwise, in the retract mode secondary member is rotated anticlockwise, and in the neutral mode the secondary member is not rotated in either direction.

12. The semitrailer landing gear controller assembly of claim 11, wherein the turbine further includes a plurality of protruding arms extending out toward the front end of the primary member, and configured to removably secure the turbine to the secondary member via a plurality of grooves disposed on the second end of the secondary member configured to receive the plurality of protruding arms.

13. The semitrailer landing gear controller assembly of claim 12, herein the removably attached rollers each include a threaded portion configured to fasten the rollers to the primary member.

14. The semitrailer landing gear controller assembly of claim 11, wherein the primary member further includes an air channel having a first end and a second end interconnected at the air intake aperture.

15. The semitrailer landing gear controller assembly of claim 14, wherein the first end is configured to expel pressurized air to rotate the turbine in the clockwise direction, and the second end is configured to expel pressurized air to rotate the turbine in the anticlockwise direction.

16. The semitrailer landing gear controller assembly of claim 15, wherein the controller switch is operably connected to a stopper via a control line, such when the controller switch is in the extend position the stopper is configured to redirect all incoming pressurized air toward the first end, when the controller switch is in the retract position the stopper is configured to redirect all incoming pressurized air toward the second end, and when the controller switch is in the neutral position the stopper is configured to prevent all incoming pressurized air from entering the air channel.

17. The semitrailer landing gear controller assembly of claim 16, wherein the stopper is T-shaped.

18. The semitrailer landing gear controller assembly of claim 1, wherein the rollers disposed on either side of the primary member are removably attached.

19. The semitrailer landing gear controller assembly of claim 1, wherein the open first end of the secondary member is smaller than the second end such that the tapers inwards as it extends outward from the second end toward the first end.

* * * * *